United States Patent [19]
Amano et al.

[11] Patent Number: 5,845,858
[45] Date of Patent: Dec. 8, 1998

[54] FISHING SPINNING REEL

[75] Inventors: Tomoyuki Amano, Saitama; Eiji Shinohara, Tokyo, both of Japan

[73] Assignee: Daiwa Seiko, Inc., Tokyo, Japan

[21] Appl. No.: 785,157

[22] Filed: Jan. 13, 1997

[30] Foreign Application Priority Data

Jan. 11, 1996 [JP] Japan ................................. 8-003085
Jan. 26, 1996 [JP] Japan ............................. 8-000746 U

[51] Int. Cl.⁶ .................................................. A01K 89/01
[52] U.S. Cl. ........................................ 242/231; D22/141
[58] Field of Search ................................ 242/230, 231, 242/232, 233; D22/141

[56] References Cited

U.S. PATENT DOCUMENTS

| D. 324,092 | 2/1992 | Baugh et al. | D22/141 |
|---|---|---|---|
| D. 336,677 | 6/1993 | Shiozaki | D22/141 |
| D. 350,587 | 9/1994 | Storz | D22/141 |
| 3,459,387 | 8/1969 | Miyamae | 242/232 |
| 3,797,774 | 3/1974 | Dumbauld | 242/232 |
| 5,193,762 | 3/1993 | Takeuchi | 242/232 |
| 5,261,627 | 11/1993 | Shinohara | 242/231 |
| 5,368,247 | 11/1994 | Young | 242/231 |
| 5,379,958 | 1/1995 | Takeuchi | 242/232 |

FOREIGN PATENT DOCUMENTS

| 3-74260 | 7/1991 | Japan . |
|---|---|---|
| 4-65068 | 6/1992 | Japan . |
| 6-26466 | 4/1994 | Japan . |

*Primary Examiner*—Katherine Matecki
*Attorney, Agent, or Firm*—Sughrue, Mion, Zinn, Macpeak & Seas, PLLC

[57] ABSTRACT

In a fishing spinning reel, a supporting member having a fishing line guide is swingably supported on an end portion of a rotor so that the supporting member is placed alternately in a line take-up state and in a line let-out state. The outer configuration of the supporting member is formed such that a portion of the supporting member, which is from its base portion to the end portion having the fishing line guide, is inclined towards a spool. The spinning reel is free from the entanglement of the fishing line and is able to maintain the rotation of the rotor balanced.

2 Claims, 9 Drawing Sheets

FISHING SPINNING REEL

BACKGROUND OF THE INVENTION

This invention relates to a fishing spinning reel.

A fishing spinning reel, as disclosed by Japanese Patent Application (OPI) No. 65068/1992 (the term "OPI" as used herein means an "unexamined published application"), is designed as follows: A supporting member having a fishing line guide is supported at the end of a rotor which is turned in association with the handle, in such a manner that the supporting member is switched so as to be alternately placed in a line let-out state and a line take-up state. When the line let-out state of the supporting member is switched over to the line take-up state, the fishing line is guided along the bail to the fishing line guide, so that it is uniformly wound on the spool in association with the rotation of the rotor and the forward and backward movement of the spool.

During fishing, sometimes the fishing line is twisted, or curled, or it is loosened or looped because of the change in tensile strength of the fishing line. As a result, a line take-up operation, or the blow of wind may cause the line to be entangled around the vicinity of the fishing line guide of the supporting member. This may result in a problem that it becomes difficult to take up the fishing line or the fishing line is broken when wound up forcibly.

In order to overcome the problem, Japanese Utility Patent Application (OPI) No. 74260/1991 has disclosed a spinning reel in which a line entanglement preventing member is provided between the bail mounted on the supporting member and the fishing line guide.

However, the spinning reel disclosed by the aforementioned Japanese Utility Patent Application (OPI) No. 74260/1991 suffers from the following difficulties: As was described above, the line entanglement preventing member is provided between the bail and the fishing line guide. Hence, it is intricate in structure, and it is impossible to simplify the structure. Furthermore, it is impossible to effectively prevent the fishing line from being entangled or looped around the supporting member. Moreover, the line entanglement preventing member thus provided shifts the center of gravity of the spinning reel forwardly, which makes it difficult to maintain the rotation of the rotor balanced.

Japanese Utility Patent (OPI) No. 26466/1994 also discloses a fishing spinning reel in which a bail supporting member having a fishing line guide is pivotally mounted outside the end portion of the bail supporting arm of the rotor in such a manner that it is swingable back and forth.

In the spinning reel, in order to prevent the fishing line from being entangled around the bail supporting member, the outer surface of the bail supporting member is smooth, having no step. However, the inner surface of the bail supporting member is not smooth: That is, the fishing line guide such as a line roller is mounted on the end portion of the inner surface of the bail supporting member, and the bail supporting member forms steps with respect to the inner surface of the bail supporting arm. Hence, during fishing, winds and waves, or during a pumping operation, the loosening or twisting of the fishing line often causes the fishing line to be entangled around the bail supporting member or the steps of the bail supporting arm. This adversely affects the fishing-line take-up operation, or breaks or damages the fishing line.

SUMMARY OF THE INVENTION

Accordingly, an object of the invention is to provide a fishing spinning reel which is free from the entanglement of the fishing line and is able to maintain the rotation of the rotor balanced.

The foregoing object of the invention has been achieved by the provision of a fishing spinning reel in which, according to the invention, the outer configuration of said supporting member is such that the supporting member is inclined (or curved) towards a spool.

In general, the fishing line wound on the spool is entangled around the supporting member because the fishing line, being twisted or loosened, is looped, thus being caught by the end portion of the fishing-line supporting member. However, with the fishing spinning reel of the invention, the outer configuration is such that the supporting member is inclined (or curved) towards the spool. Hence, even if the fishing line is looped around the supporting member, the fishing line gets unwound naturally by the tensile force of the fishing line provided when the rotor is turned, or it can be readily removed with the user's fingers. In addition, the spinning reel of the invention is free from the difficulty that it is necessary to additionally provide the line entanglement preventing member for the supporting member, and therefore the rotation of the rotor is maintained balanced.

In the fishing spinning reel, according to another aspect of the invention, the outer configuration of the supporting member is such that the portion of the supporting member, which is from the base portion to the end portion having the fishing line guide, is substantially in parallel with a spool shaft. With the fishing spinning reel, even if the fishing line is entangled around the supporting member, the fishing line can be readily removed with user's the fingers, because the supporting member is not protruded on the side which is opposite to the side where the spool is provided.

In the fishing spinning reel according to yet another aspect of the invention, the line entanglement preventing member is provided between the inner surface of the bail supporting arm and the outer surface-of the fishing line guide at the end of the base supporting member. The line entanglement preventing member of the present invention is swingably supported with respect to the inner surface of the bail supporting arm so that the line entanglement preventing member and the bail support member pivotally supported on the bail supporting arm both take a line take-in position and a line let-out position alternately. The line entanglement preventing member forms no step with respect to the inner surface of the bail supporting arm and has a smooth (inner) surface, and is fixedly secured to the outer surface of the fishing line guide at the end of the bail supporting member with a screw or the like, or formed integral with the bail supporting member.

DETAILED DESCRIPTION OF THE PREFERRED EMBODIMENTS

FIGS. 1 through 4 show an embodiment of a fishing spinning reel according to the invention.

Figures 1, 2:
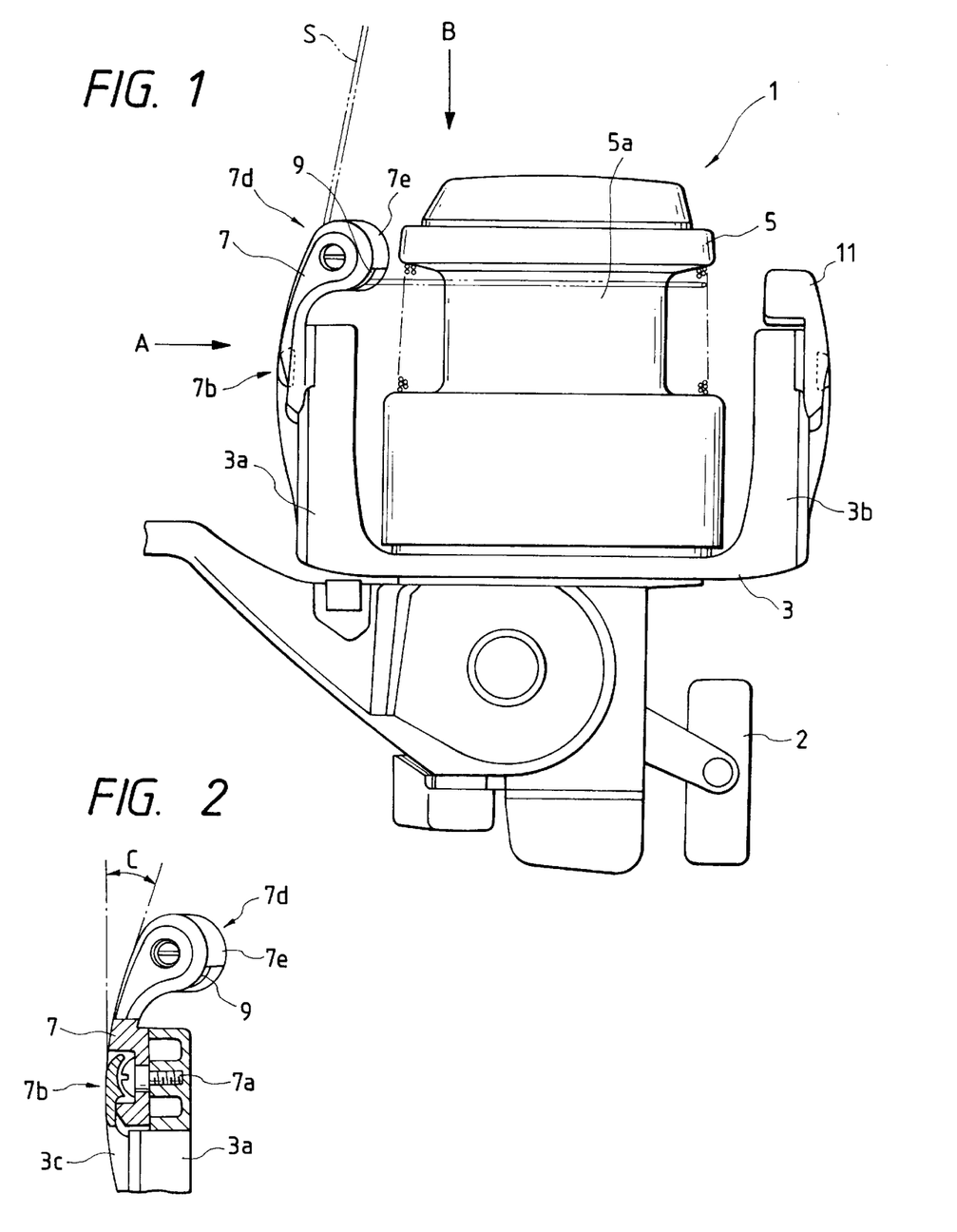
FIG. 1 is a side view showing the whole arrangement of an embodiment of a fishing spinning reel according to the invention.
FIG. 2 is a sectional view, with parts cut away, showing a part of a bail supporting member illustrated in FIG. 1.
Figure 3:
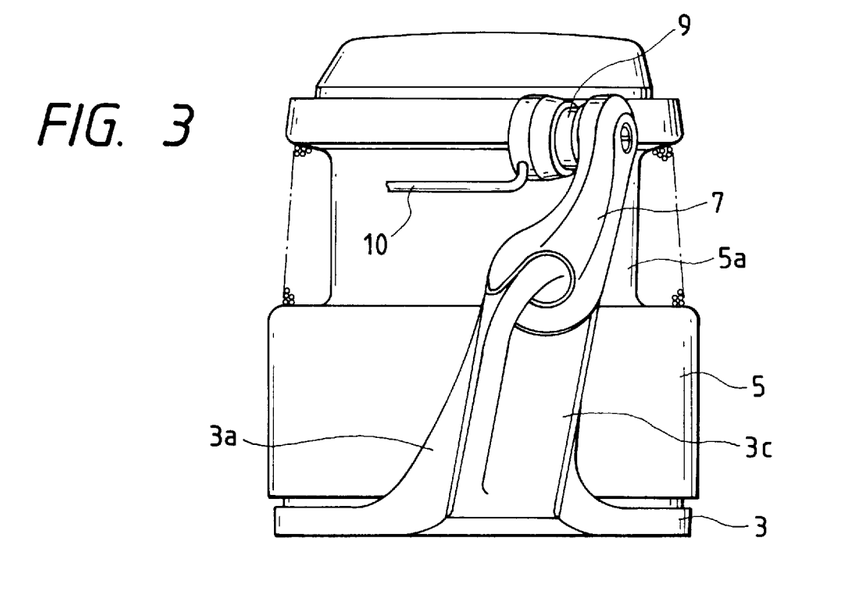
FIG. 3 is a side view of a reel body as viewed in the direction of the arrow A which is shown in FIG. 1.
Figure 4:
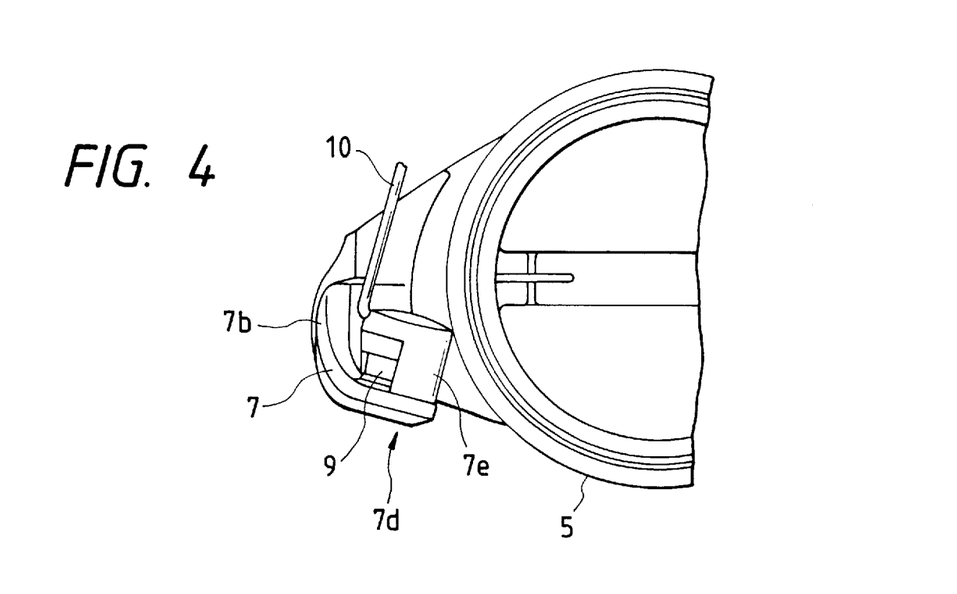
FIG. 4 is a top view of the reel body as viewed in the direction of the arrow B which is shown in FIG. 1.

The reel body 1 comprises: a rotor 3 which is rotated in association with the turning of a handle 2; and a spool 5 which is moved back and forth in association with the rotation of the rotor 3. The rotor 3 includes a pair of arms 3a and 3b. The end portion of the arm 3a supports a supporting member 7 which is switched so that it is placed alternately in a line take-up state and a line let-out state. The top portion of the supporting member 7 supports a fishing line guide 9 (hereinafter referred to as "a line roller 9", when applicable) which guides the fishing line S from the top of the rod to the winding section 5a of the spool 5.

The front end portion of the line roller 9 is coupled to one end portion of the bail 10, the other end portion of which is coupled to a bail supporting member 11 which is supported on the front end portion of the rotor 3 in such a manner that it is freely turned over. When the line let-out state of the bail 10 is switched over to the line take-in state, the fishing line S being let out is picked up, and guided to the line roller 9.

The preferred embodiment has been described; however, the invention is not limited thereto or thereby; for instance, the technical concept of the invention may be applied to the spinning reel having no bail 10.

The supporting member 7, as shown in FIG. 2, is supported on the top end portion of the arm 3a of the rotor 3 with the aid of a supporting screw 7a in such a manner that it is freely swung in a direction perpendicular to the surface of the drawing. The surface of the arm 3a is covered with a cover 3c. The outer configuration of the supporting member 7 is as shown in FIG. 2; that is, a portion of the supporting member 7 which is extended from a part portion 7b supported by the arm 3a (hereinafter referred to as "a base portion 7b", when applicable) to the top end portion 7d holding the line roller 9 is inclined towards the spool. In particular, the outer configuration of the supporting member 7 is curved toward the spool in such a manner that it is gradually larger in the angle of inclination towards the end thereof. Hence, even if the fishing line S is looped, or attempts to be entangled, around the supporting member 7, it will get unwound along the inclination of the supporting member 7. The angle of inclination C of the latter, from the base 7b to the top end portion 7d is not particularly limited; that is, it should be determined, for instance, according to the diameter of the spool 5.

Figure 5:
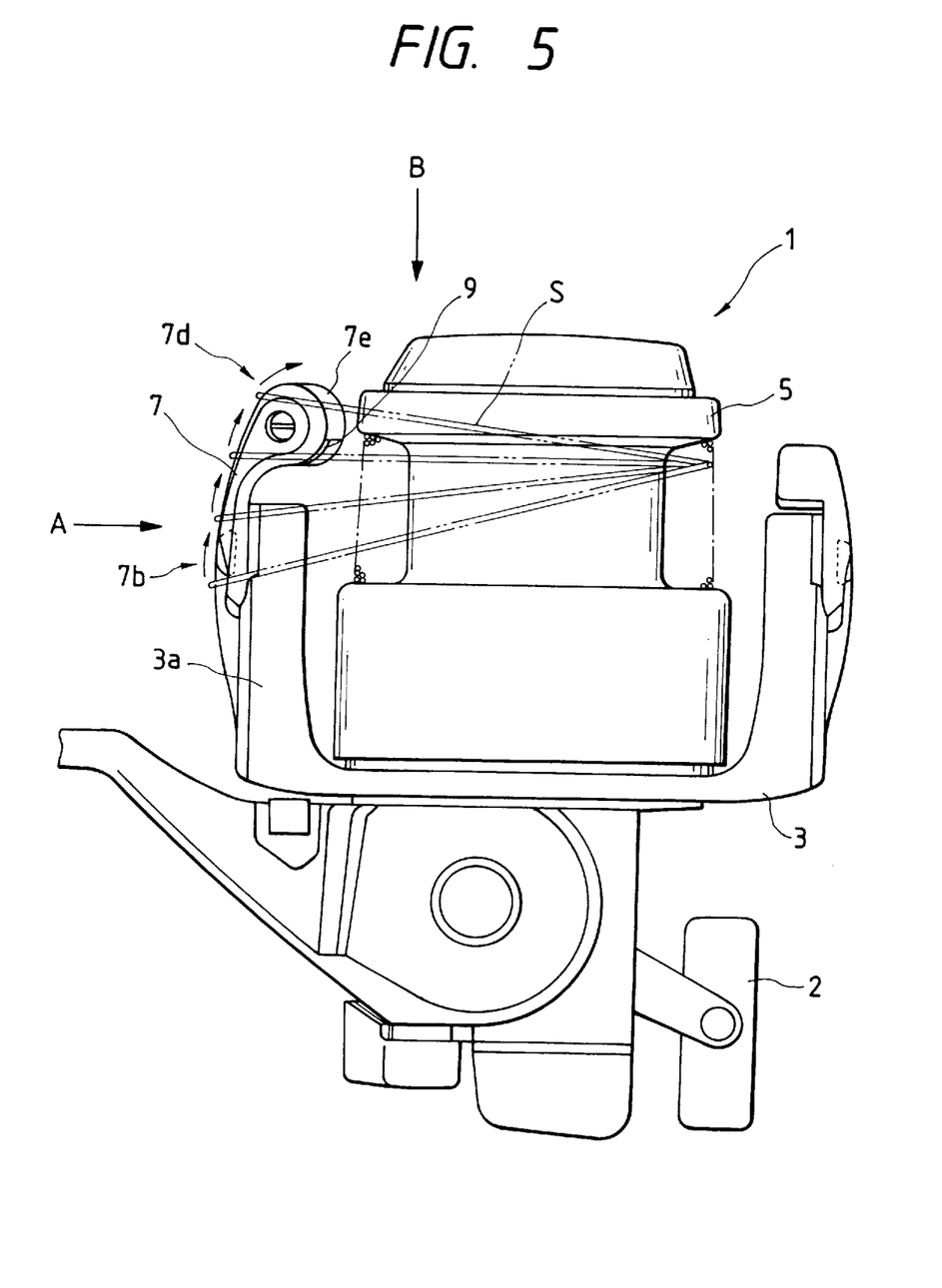
FIG. 5 is a side view showing, how the fishing line gets unwound from a supporting-member of the spinning reel shown in FIG. 1.
Figure 6:
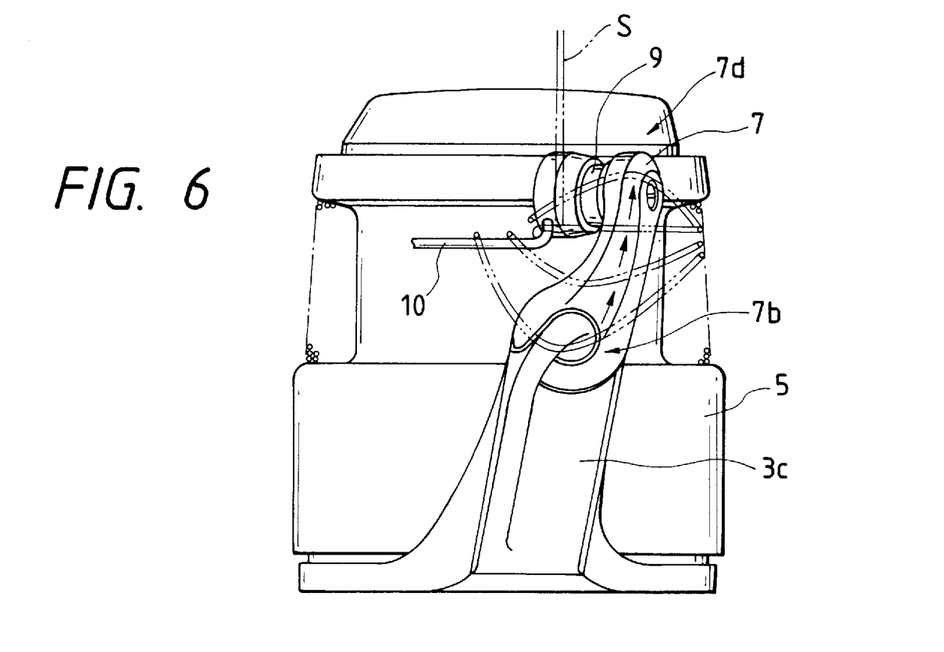
FIG. 6 is a side view of the reel body as viewed in the direction of the arrow A which is shown in FIG. 5.
Figure 7:
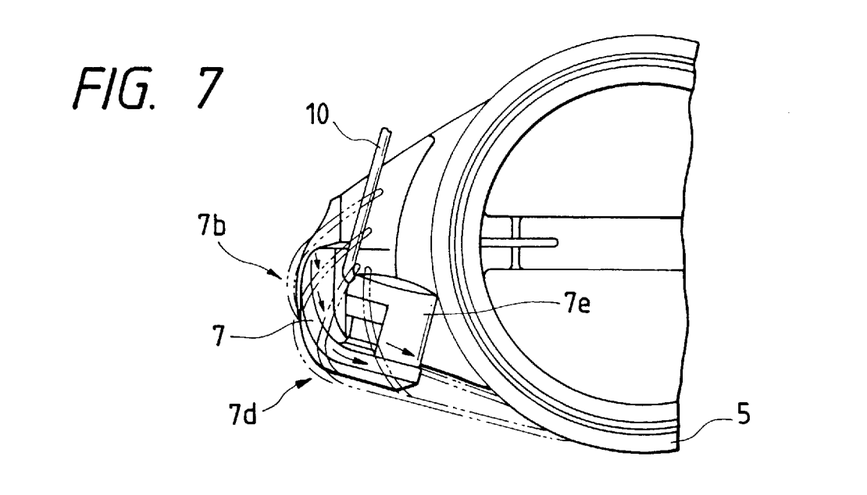
FIG. 7 is a top view of the reel body as viewed in the direction of the arrow B which is shown in FIG. 5.

A manner in which the fishing line gets unwound or released is as shown in FIGS. 5, 6 and 7. As is seen from those figures, even if the fishing line attempts to be entangled around the supporting member 7 up to near the base portion 7b because the fishing line S is twisted or loosened, the fishing line is smoothly moved along the inclined surface of the supporting member 7, thus getting unwound. The fishing line S is smoothly moved in the direction of the arrows by the tensile force provided when the rotor is turned with the handle, or by the finger operation.

It is preferable that, as shown in FIG. 5, the top end portion 7d of the supporting member 7d has a line entanglement preventing piece 7e as its part which covers a part of the line roller 9. The formation of the line entanglement preventing piece 7e results in that the line roller 9 forms no step, which more effectively prevents the entanglement of the fishing line.

It is preferable that the outer configuration of the supporting member 7 is as shown in FIG. 5; that is, it is gradually larger in the angle of inclination beginning with the base portion 7b (towards the top end portion 7d); however, the invention is not limited thereto or thereby. That is, the outer configuration of the supporting member may be substantially in parallel with the spool shaft. In this modification, the outer configuration is not inclined towards the spool, and therefore it is difficult to get the fishing line unwound with the tensile force of the fishing line provided when the rotor is turned; however, it is possible to readily get the fishing line unwound with the fingers because no projection is formed on the side of the supporting member which is opposite to the side where the spool is provided.

In the above-described embodiment, the supporting member is gradually larger in the angle of inclination towards the top end portion 7d beginning with the base 7b; however, the outer configuration of the supporting member 7 may be changed in various manners as long as the fishing line is prevented from getting entangled. For instance, it may be modified as follows: The lower portion of supporting member 7, which is between the base and the middle, is somewhat protruded outwardly; however, the remaining upper portion between the middle and the top end portion is curved towards the spool beginning with the middle. In this case, too, the fishing line is scarcely entangled around the supporting member; that is, the fishing line is effectively prevented from being entangled around the supporting member.

Figure 8:
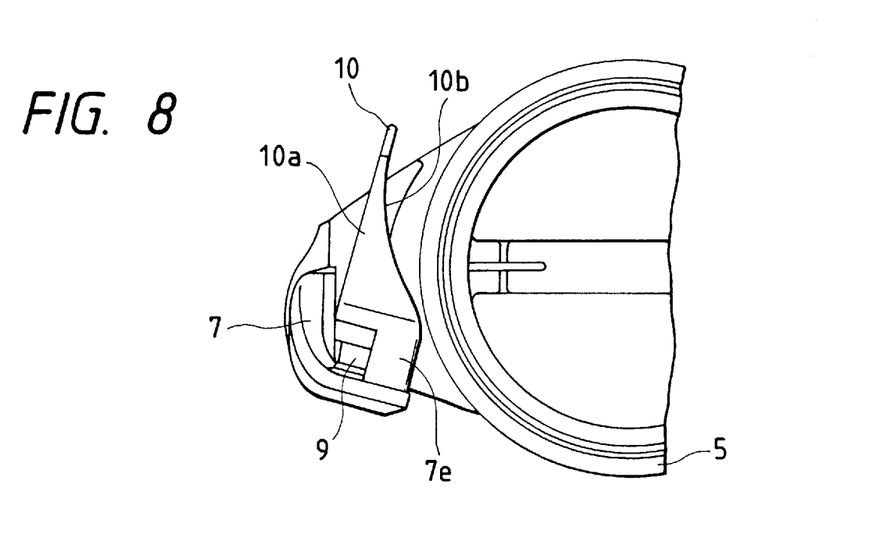
FIG. 8 is a top view, with parts cut away, showing another embodiment of the fishing spinning reel of the invention.
Figure 9:
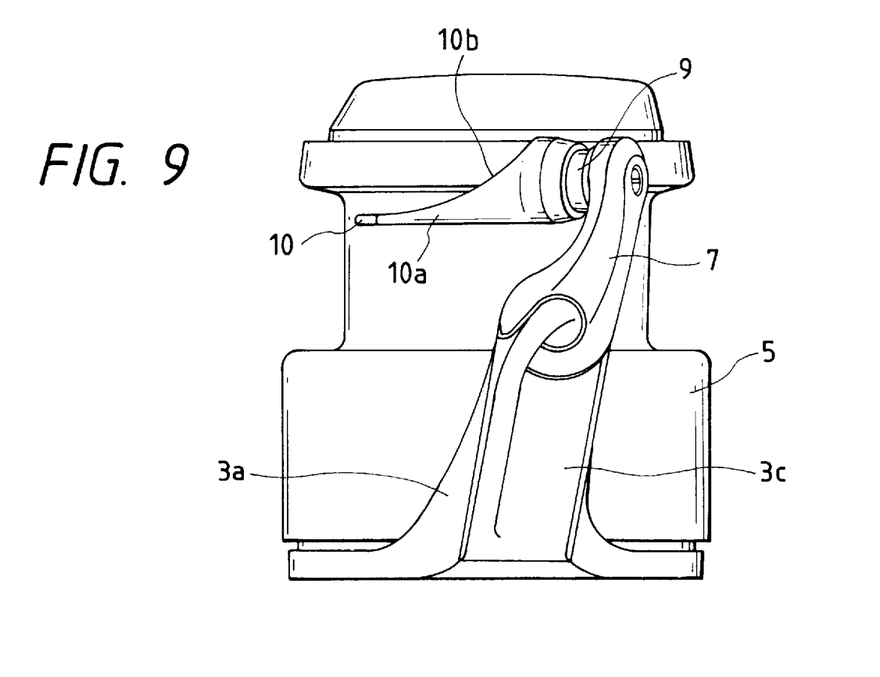
FIG. 9 is a side view of a supporting member and a spool in the fishing spinning reel shown in FIG. 8.

FIGS. 8 and 9 shows another embodiment of the fishing spinning reel according to the invention, in which the bail mounting portion of the supporting member of the fishing spinning reel shown in FIG. 1 is modified. The end portion of the supporting member is integral with a line entanglement preventing piece 7e in such a manner that it covers a part of the line roller 9 supported thereby. A bail 10 is connected to the line entanglement preventing piece 7e through a bail mounting portion 10a which has a smooth surface 10b as shown in FIGS. 8 and 9. In this modification, the supporting member 7, the line entanglement preventing piece 7e, the bail mounting portion 10a, and the bail 10 may be provided as individual components, which are assembled together; or they may be provided as one component from beginning.

With the modification, the end portion of the supporting member 7 which is adapted to guide the fishing line has no steps; that is, its surface is smooth. This feature more positively prevents the fishing line from twining around the supporting member.

In the fishing spinning reel of the invention, with the simple structure it is possible to prevent the fishing line from being entangled around the vicinity of the fishing line guide while readily maintaining the rotation of the rotor balanced. Thus, the resultant fishing spinning reel is high in operability.

Figure 10:
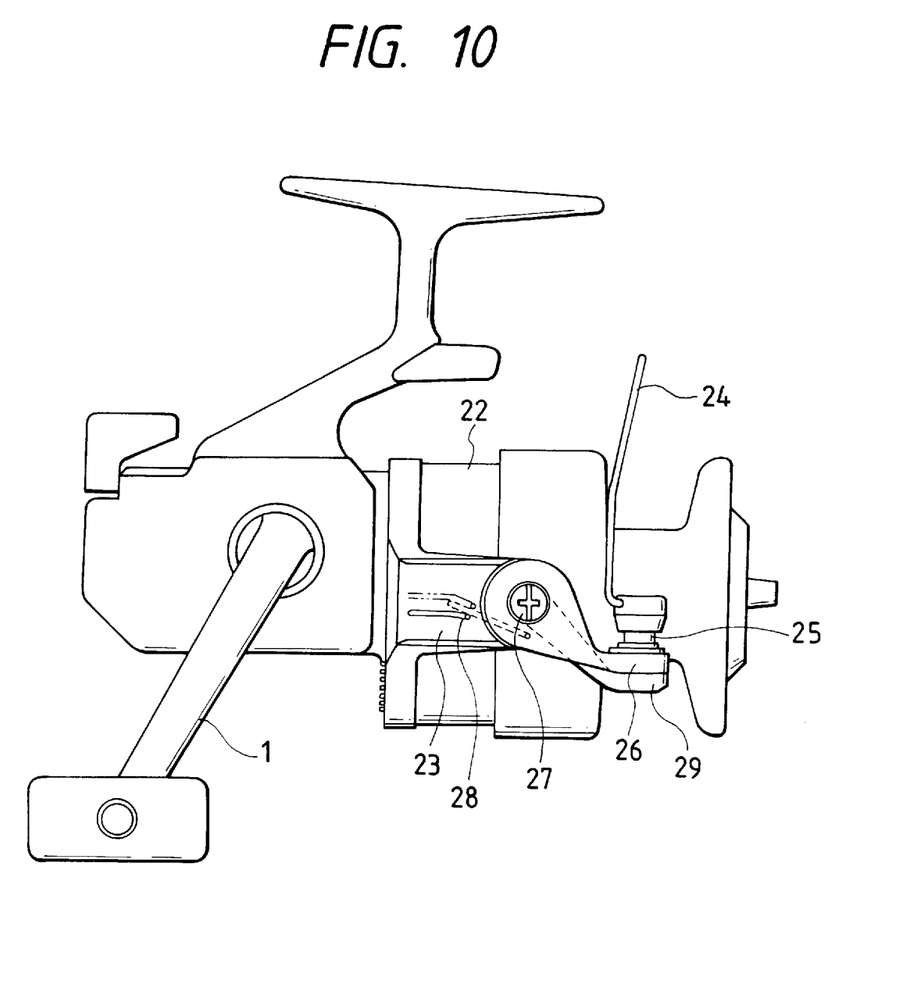
FIG. 10 is a side view of another embodiment of a fishing spinning reel of the invention.
Figure 11:
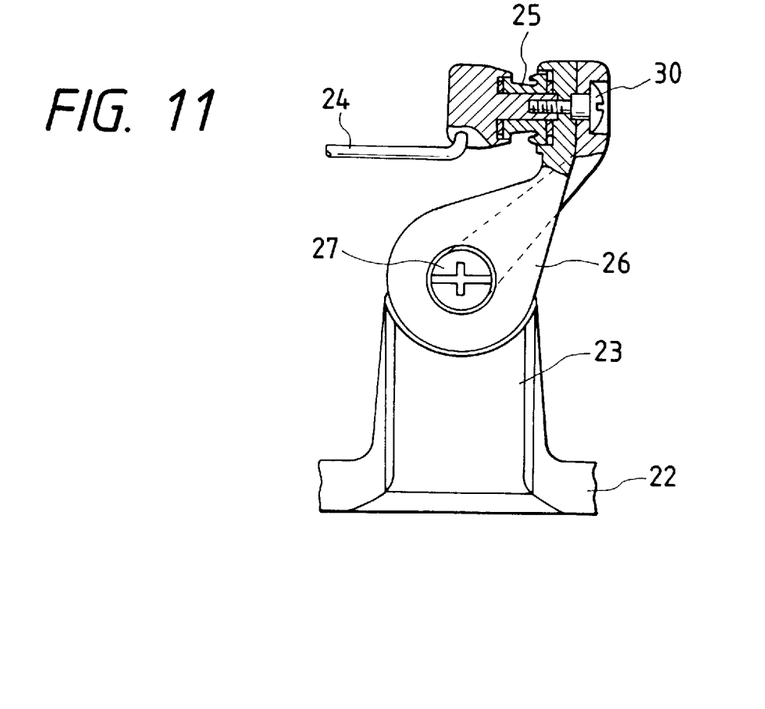
FIG. 11 is a side view, with parts cut away, showing essential components of the fishing spinning reel illustrated in FIG. 10.
Figure 12:
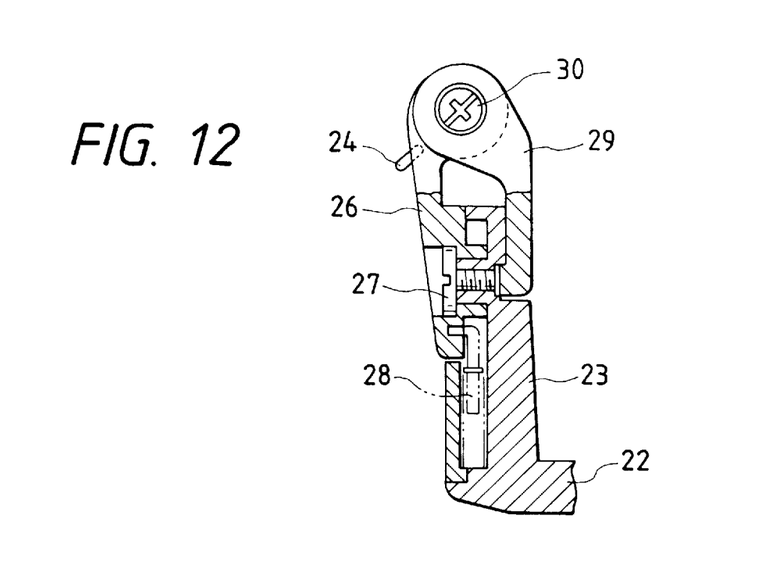
FIG. 12 is a side view, with parts cut away, showing essential components of the fishing spinning reel illustrated in FIG. 10.

FIGS. 10 through 12 show another embodiment of a fishing spinning reel according to the invention.

In the spinning reel, a rotor 22 is turned with a handle 21, and a pair of bail supporting arms 23 are provided on both sides of the rotor 22 in such a manner that the former 23 are integral with the latter 22. Outside the end portion of the bail supporting arm 23, a bail supporting member 26, which has a bail 24 and a fishing-line guide roller 25 on the end, is swingably supported through an urging spring 28 with a pivotal pin 27 in such a manner that the bail supporting member 26 is placed alternately in a line take-up position and in a line let-out position.

A line entanglement preventing member 29 whose surface is smooth is provided between the inside of the pivot section where the bail supporting arm 23 supports the bail supporting member 26 and the outside of the fishing-line guide roller 25 at the end of the base supporting member. The line entanglement preventing member 29 is swingably supported in such a manner that it forms no step with respect to the inner surface of the bail supporting arm 23 with the base end portion of the line entanglement preventing member 29 lapped over the bail supporting arm 23, and the end portion is secured to the outer surface of the end portion of the bail supporting member 26 with the mounting pin 30 of the fishing-line guide roller 25.

Figure 13:
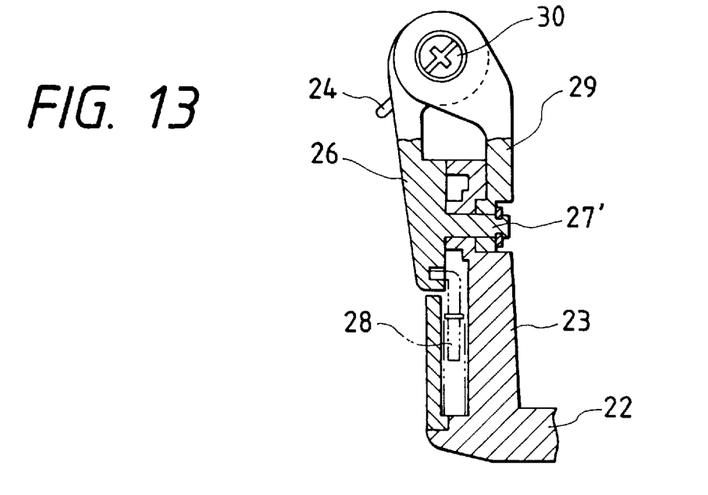
FIG. 13 is a side view, with parts cut away showing essential components of another embodiment of the fishing spinning reel of the invention.

In another embodiment of the fishing spinning reel of the invention, as shown in FIG. 13, a pivot pin 27' protruded from a bail supporting member 26 is coupled to a bail supporting arm 23, and the base portion of a line entanglement preventing member 29 is swingably coupled thereto.

Figure 14:
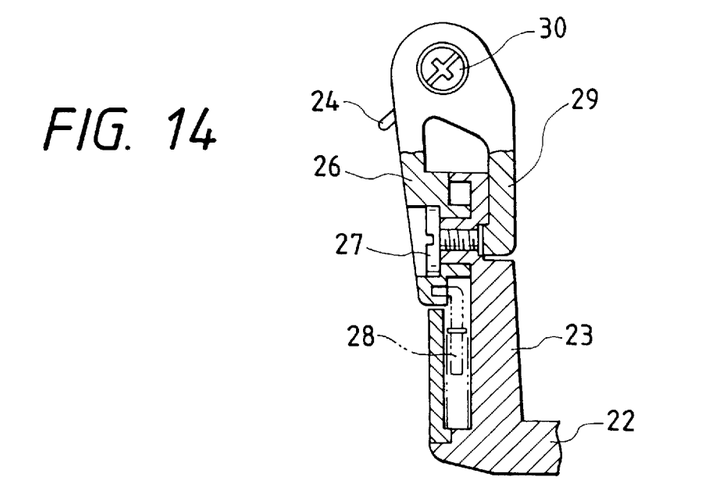
FIG. 14 is a side view, with parts cut away, showing essential components of another embodiment of the fishing spinning reel of the invention.

FIG. 14 shows yet another embodiment of the fishing spinning reel of the invention. The embodiment is obtained by making the bail supporting member 26 and the line entanglement preventing member 29 integral with each other in the embodiment shown in FIGS. 10 through 12.

Figure 15:
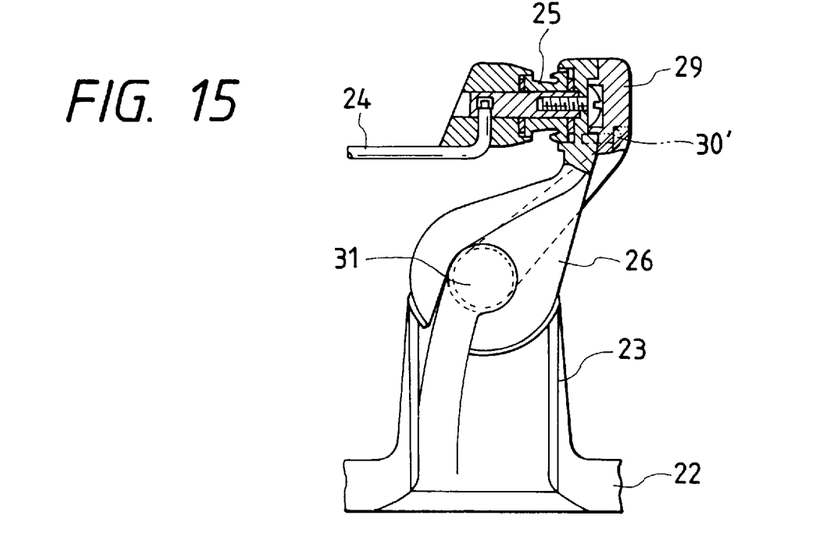
FIG. 15 is a side view, with parts cut away, showing essential components of another embodiment of the fishing spinning reel of the invention.
Figure 16:
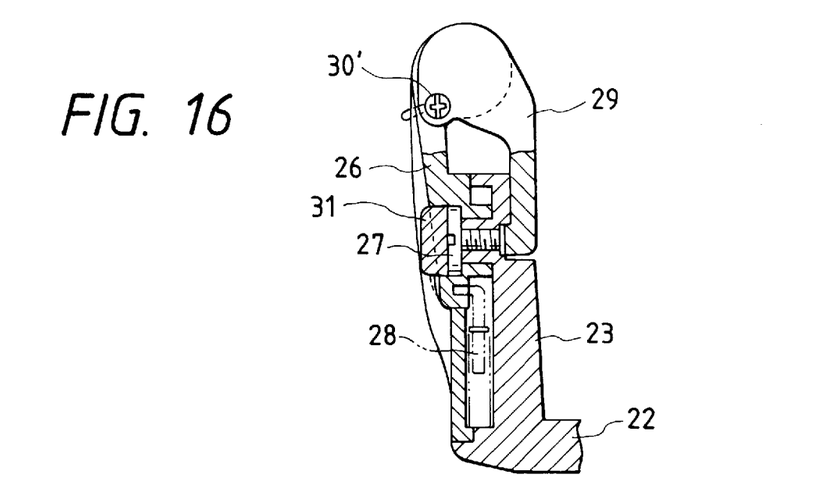
FIG. 16 is a side view, with parts cut away, showing essential component of the fishing spinning reel shown in FIG. 15.

FIGS. 15 and 16 shows still another embodiment of the fishing spinning reel of the invention. The embodiment may be obtained by modifying the fishing spinning reel in which the end portion of the line entanglement preventing member 29 is secured to the end portion of the bail supporting member 26, in such a manner that instead of the mounting pin 30, a special pin 30' is employed. In FIGS. 15 and 16, reference numeral 31 designates a stop plug provided on the bail supporting arm 23 for closing the mounting hole into which the pivot pins 27 have been inserted.

As was described above, the fishing spinning reel in which the bail supporting member having the fishing line guide is pivotally coupled to the outer surface of the end portion of the bail supporting arm of the rotor in such a manner that the bail supporting member is swingable, has the following merits or effects: The line entanglement preventing member positively eliminates the difficulty that, during fishing, the fishing line loosened, being caught by the bail supporting member or the steps on the inner surface of the bail supporting arm, is entangled therearound. Thus, with the fishing spinning reel of the invention, the fishing operation can be carried out smoothly.

What is claimed is:

1. A fishing spinning reel in which a fishing line guide is supported on an end portion of a supporting member and a base portion of said supporting member is swingably supported on a rotor for winding a fishing line onto a spool, wherein said end portion extends at least partially around said guide, and an outer surface of said supporting member, extending continuously from said base portion to said end portion including said end portion, is inclined towards said spool, and wherein said outer surface is curved so that an angle of inclination of said outer surface relative to said spool increases toward said end portion.

2. A fishing spinning reel as recited in claim 1, further comprising:

a bail; and a bail mounting portion provided between said bail and said line guide, said bail mounting portion having a substantially smooth surface, said substantially smooth surface gradually widening from said bail to said line guide.

* * * * *